United States Patent Office 3,240,725
Patented Mar. 15, 1966

3,240,725
SPRAY POLYMERIZATION OF POLY(HALO-
METHYL) DIPHENYL ETHER
Russell J. Raymond, and David R. Ball, Midland, Mich., assignors to The Dow Chemical Company, Midland, Mich., a corporation of Delaware
No Drawing. Filed Jan. 11, 1963, Ser. No. 250,752
6 Claims. (Cl. 260—2.5)

This invention relates to a new process for the polymerization of poly(halomethyl)diphenyl ethers and more particularly to the spray polymerization of these ethers whereby the resulting resinous polymer is obtained as fine, free flowing granules.

The thermal polymerization of poly(halomethyl)diphenyl ethers to give hard, solid resinous products, insoluble in water and common organic liquids, is described by Doedens in U.S. Patent 2,911,380. The process is broadly applicable to the preparation of thermoset polymeric resins from a reactive aromatic material comprising a major proportion by weight of a halomethyldiphenyl ether having an average of at least one halomethyl group per diphenyl ether moiety. Furthermore, it has been found that hydrogen halide release during the polymerization can be trapped within the polymerizing mass so that the product can be obtained as a resinous foam. In the absence of catalysts, polymerization temperatures greater than about 120° C. are generally required. However, with catalyst such as aluminum chloride, ferric chloride, ferric phosphate and other Lewis acids, polymerization occurs at somewhat lower temperatures. The resulting poly(halomethyl)diphenyl ether foams have superior thermal and moisture stability even when the polymer contains residual unreacted halomethyl groups. These properties are obviously highly advantageous for many uses.

In some applications, a fine granular product would be more desirable than the large pieces of resinous foam obtained by bulk polymerization. For example, finely-divided, inert granules are useful as light weight fillers, extenders, or texturing agents in inks, paints, and other coating compositions, as well as in rubber and plastic materials. While finely-divided product particles can be obtained by grinding or crushing the resinous foam obtained by bulk polymerization, such particles are very irregular in size and shape and include not only the preferred hollow granules but also thin flakes, clumps of broken cells, and other less desirable forms.

The resinous foam obtained by bulk polymerization often retains sufficient residual hydrogen halide to give an objectionable odor unless it is further treated to remove all residual hydrogen halide. Since the resinous foam has a predominately open cell structure, an aging period of 12 to 24 hours or more is sufficient to remove the bulk of the hydrogen halide. But complete removal usually requires the further step of applying vacuum or pressure to displace all the residual hydrogen halide with an inert gas such as air.

In addition, no method is known for making solid, unfoamed products by polymerization of halomethyldiphenyl ethers in the absence of additives such as sodium hydroxide, potassium carbonate, and the like.

It is an object of the present invention to provide a process whereby fine, free-flowing granular foamed particles of poly(halomethyl)diphenyl ethers are readily obtained directly by polymerization of halomethylated diphenyl ethers without a subsequent grinding or crushing operation. A further object is to provide a method whereby fine, free-flowing solid particles are obtained by the polymerization of halomethylated diphenyl ethers in the absence of special additives. Another object is to obtain a poly(halomethyl)diphenyl ether resin wherein the by-product hydrogen halide is completely removed during the polymerization process to give a product that is free of residual hydrogen halide.

These and other objects are obtained by the spray polymerization of a reactive aromatic material comprising a major proportion by weight of a halomethyldiphenyl ether having an average of at least one halomethyl group per diphenyl ether moiety, the halogen being chlorine or bromine. The spray polymerization process consists of passing the reactive aromatic composition in a finely-divided form through a heated zone, wherein polymerization to finely-divided resinous granules occurs with concomitant liberation of hydrogen halide, followed by recovering the polymerized product.

The halomethyldiphenyl ethers utilized as starting materials in the synthesis of the polymerization products described herein are well known materials that are readily obtained by the chloromethylation or bromomethylation of diphenly ether, preferably as described by Doedens in U.S. Patent 2,911,380. Since halomethylation occurs largely at the 2 and 4 positions of each aromatic ring, the crude halomethyldiphenyl ether thereby obtained is predominately a mixture of isomers and homologs having from 1 to 4 halomethyl groups per diphenyl ether moiety. The exact composition is dependent on reaction conditions, and particularly on the proportion of halomethylating agent employed. Occasionally small amounts of unreacted diphenyl ether may also be present.

For use in the process of this invention, individual halomethyldiphenyl ethers having from 1 to 3 halomethyl groups per diphenyl ether moiety can be easily isolated and purified from the crude reaction product. However, a crude halomethyldiphenyl ether having an average of at least one halomethyl group per diphenyl ether moiety is often advantageously used. For example, spray polymerization of a crude chloromethyldiphenyl ether containing an average of 1.12 chloromethyl groups per diphenyl ether moiety (17.6 weight percent chlorine), gives the desired finely-divided resinous granules. If the average halomethyl content of the crude halomethyldiphenyl ether is less than one, thermoset resinous products will not be obtained unless an additional cross-linking agent is employed.

The reactant mixture may contain together with the halomethyldiphenyl ether minor amounts of up to 10 to 20 weight percent of other reactive non-halomethyl aromatic materials as modifiers. Examples of such modifiers are diphenyl ether and similar aromatic ethers, phenolic compounds having at least one active aromatic ring position, biphenyl, toluene, and other similar aromatic compounds. Polymeric materials having a reactive aromatic nucleus can also be employed as foam modifiers. At least a portion of such non-halomethyl reactants usually enters into the polymerization reaction and becomes chemically bonded in the final product. Lesser amounts of other ingredients such as fillers, surfactants and stabilizers may also be included in the reactant mixture to control such properties as product density, pore size, cell structure, strength, and friability.

Polymerization of halomethyldiphenyl ethers is promoted by catalysts of the Lewis acid type. Included within the scope of operable catalysts are aluminum chloride, ferric chloride, stannic chloride, zinc chloride, ferric phosphate, boron trifluoride, hydrogen chloride, sulfuric acid, phosphoric acid, and the like. These catalysts are highly effective even when present in very small proportions and/or in a form deactivated by contact with water or with aqueous solutions of the acids, bases or salts. Particularly suitable for spray polymerization is a 50 percent solution of ferric chloride in methanol. This catalyst solution is completely miscible with halomethyldiphenyl ethers and minimizes the problem of plugging a spray nozzle sometimes encountered with other catalysts which are not as soluble in the reactant mixture. Effective results are generally obtained by employing the catalyst at a concentration of about 0.01 to 2.0 weight percent based on the halomethyldiphenyl ether content.

In the practice of this invention, the reactants and catalyst are generally mixed at room temperature, most mixtures being stable and liquid at ordinary temperatures. Slurries and suspensions of catalyst or other reactants in a liquid chloromethyldiphenyl ether may also be used provided the solid particles are fine enough to disperse uniformly in the reactant mixture and spray droplets. Obviously, the viscosity of the mixture must be low enough to permit formation of droplets as the mixture passes through the atomizer. If necessary, the viscosity can often be reduced by heating the reactant mixture provided the temperature is held below the initiation point for the particular system. Alternately, multiple feed streams can be used with mixing of preheated halomethyldiphenyl ether and a separate catalyst stream in the atomizer just before spraying into the heated polymerization zone.

In the atomizer, the reaction mixture containing a major portion of halomethyldiphenyl ether is formed into small divided particles or droplets by means of a spray nozzle, spinning disc, or other suitable device. The small particles or droplets are then injected or blown into a heated zone so that each falls freely and is heated to a temperature at which polymerization occurs. Since the polymerization reaction once initiated is highly exothermic, the polymerization of the spray droplets or particles is extremely rapid, going essentially to completion within a few seconds or less.

With small quantities of material, a simple hot air drying oven can be used to provide suitable polymerization conditions so that solid particles are obtained before the spray droplets strike a hard surface. Alternately, conventional spray drying equipment can be used, the droplets being heated by a current of hot, inert gas such as air. The air flow can be adjusted to keep the polymerizing droplets in the heating zone for a time adequate for complete polymerization. Still other heating means will be evident to those skilled in the art.

The temperature employed in the heated zone is, of course, dependent upon the initiation temperature required for polymerization of a given reactant mixture. Both the amount and the specific properties of the catalyst used are critical in determining the necessary temperature. In general, however, a temperature in the range of about 60° to 200° C. or more, and preferably from 90° to 150° C., is employed. Temperatures in excess of that required to initiate the polymerization generally have little effect upon the further polymerization or on the physical and chemical properties of the resulting polymerization product as long as the thermal stability of the product is not exceeded.

Although the choice of catalyst and polymerization temperature is dependent upon the reactant composition being used, the process disclosed herein is not dependent upon their particular identity. Likewise, it is not dependent upon a particular reaction pressure. Polymerization is most conveniently carried out at atmospheric pressure, but it can also be accomplished at lower or higher pressures if desired. Obviously, the operating pressure will influence the properties of the resinous product when a foam is produced.

The granular products obtained by spray polymerization can be collected by gravity fall out at the bottom of the heating chamber or by other conventional means such as by centrifuge, filters, and other similar means. Because of the large quantities of gaseous hydrogen chloride or hydrogen bromide liberated during the polymerization process, depending upon the initial halomethyldiphenyl ether used, the spray polymerization process obviously must be carried out in an area equipped for the control of such gases.

Particularly critical in determining the physical characteristics of the final resinous polymer is the drop size of the reactant mixture as it passes into the heated zone. It is obvious that this drop size is affected not only by such properties as the surface tension, viscosity, and density of the reaction mixture, but also by the inherent characteristics of the atomizer. Thus in using a pressure nozzle, the spray pattern is controlled by the pressure, orifice size, and internal design of the nozzle. With a pneumatic nozzle, it is further influenced by the gas-liquid ratio and the mixing zone design. With a spinning disc atomizer the design and speed of the rotating disc are important factors. It will be evident to those skilled in the art that by an appropriate choice of nozzle design, operating pressure, etc., atomizers of many types can be employed in the practice of this invention.

By control of the atomizing conditions, it is possible to vary the size and density of the resulting polymeric particles over a large range. Polymeric granules have been obtained by the process described herein having a particle size of one micron or less to as much as several hundred or one thousand microns. For a given system, the spread in bead size may often be made extremely narrow. Particularly surprising was the discovery that it is possible by spray polymerization to prepare a product consisting of 90 percent or more of solid, essentially spherical, resinous granules. These solid particles can be obtained in sizes ranging from about 1 to 50 microns. Alternately, a polymeric product may be obtained which consists largely of foamed granules or beads ranging in diameter from 20 to 200 or more microns. Foamed particles having a diameter of less than about 50 to 75 microns are predominantly unicellular. Larger granules may contain 3 to 5 or more separate cells.

The physical form of the spray polymerized halomethyldiphenyl ether particles is believed to depend on the rate at which hydrogen halide diffuses out of the polymerizing particles. There appears to be a critical drop size which is necessary for the retention of sufficient hydrogen halide within the polymerizing mass to give a foamed product. When the droplet is smaller than the critical size, a solid particle is obtained. These are highly desirable for applications requiring a more dense, stronger granule.

Since the determination of the drop size in a spraying operation is difficult, it is generally easier to observe empirically the nature of the product as the spraying conditions are adjusted. In practice, conditions are easily found wherein 90 percent or more of the final polymeric product may be obtained either as foamed particles or as solid particles. Both the solid and foamed particles generally are essentially spherical in shape although the solid granules are somewhat more uniform both in size and in shape than the foamed particles. The density of the solid particles is about 1.1–1.2 g./cc., while the bulk density of the foamed particles is about 0.1–0.4 g./cc.

These resinous granules obtained by spray polymerization of halomethyldiphenyl ethers have excellent solvent and ultraviolet resistance. Any residual halomethyl groups in the polymeric product are extremely inert to hydrolysis. The granules also are fire-resistant, a property highly desirable in such applications as light weight pourable insulation.

In order that those skilled in the art may better understand the present invention, the following examples are given by way of illustration without limitation thereto. All parts and percentages are by weight.

Example 1.—Foamed granules

A Sprayco Engineering pneumatic nozzle, Model 125M, was mounted on the side wall of a hot air oven with a distance of about 1 meter from the nozzle tip to the opposite wall. Then a mixture of 100 parts of a crude halomethyldiphenyl ether having an average of 1.85 chloromethyl groups per diphenyl ether moiety (25.2 wt. percent chlorine) and 0.5 part of a 50 wt. percent solution of $FeCl_3$ in methanol was aspirated with an air stream through the pneumatic nozzle into the oven preheated to a temperature of about 110° C. The reactant mixture was fed at a rate of 30 to 35 g./min. with an air flow of about 15 l./min. When the entire charge had been sprayed, the hydrogen chloride was vented from the oven, and the product was removed and examined microscopically. About 90% of the resinous product was foamed granules having a particle size of from 15 to 150 microns. The remainder was largely solid particles having a diameter of from 1 to 10 microns. The granules were generally spherical in shape and were insoluble in water and common organic solvents. Although the granules contain no detectible residual hydrogen chloride, they contained an average of from about 12 wt. percent chlorine in residual chloromethyl groups.

Example 2.—Solid granules

In a manner similar to Example 1, a mixture of 100 parts of the same crude halomethyldiphenyl ether with 1.0 part of the 50 wt. percent catalyst solution was spray polymerized at a temperature of about 110° C. using a reactant feed rate of about 5 g./min. with an air flow rate of about 50 l./min. Upon examination, 95% of the resinous product was found to be solid, unfoamed granules having a diameter of from about 1 to 50 microns, about 35% being less than 7 microns and 15 to 20% ranging from 7 to 20 microns. These granules also contained about 12 wt. percent residual chlorine.

Example 3.—Other reactant mixtures

In other runs similar to those described in Examples 1 and 2, the different crude chloromethyldiphenyl ethers containing from about 1.1 to 2.8 halomethyl groups per diphenyl ether moiety were spray polymerized to give essentially identical products except for different amounts of residual chlorine. Typical chloromethyldiphenyl ether compositions which have been spray polymerized successfully are given in Table I.

TABLE I.—TYPICAL CHLOROMETHYLDIPHENYL ETHER REACTANTS

| Wt. percent Cl | 17.6 | 25.2 | 26.6 | 32.0 |
|---|---|---|---|---|
| Av. Mole Ratio: $ClCH_2$/DPE | 1.12 | 1.85 | 2.0 | 2.8 |
| Composition (mole percent): | | | | |
| Diphenyl ether (DPE) | 17.3 | 0 | 0 | 0 |
| 2-Mono(chloromethyl)DPE | 5.3 | 0.3 | 0 | 0 |
| 4-Mono(chloromethyl)DPE | 42.9 | 2.4 | 0 | 0 |
| 2,4'-Bis(chloromethyl)DPE | 10.8 | 17.7 | 0 | 1.9 |
| 4,4'-Bis(chloromethyl)DPE | 20.6 | 68.5 | 100 | 8.6 |
| Tris(chloromethyl)DPE | 2.3 | 10.5 | 0 | 89.0 |
| Tetra(chloromethyl)DPE | <1 | ~0.5 | 0 | ~1 |

Note that with the chloromethyldiphenyl ether having 17.6 wt. percent chlorine, residual diphenyl ether is present as a non-halomethylated aromatic reactant. Examination of the product obtained with this crude mixture revealed the chemical bonding of the diphenyl ether in the polymeric resin.

Other halomethyldiphenyl ether reactants having an average of from 1.0 to about 3.0 halomethyl groups, the halogen being bromine or chlorine, give similar results when spray polymerized.

We claim:
1. In a process for the thermal polymerization of a reactive aromatic material comprising a major proportion by weight of a halomethyldiphenyl ether having an average of at least one halomethyl group per diphenyl ether moiety, the halogen being bromine or chlorine, by heating said reactive aromatic material at a temperature sufficient to initiate polymerization, the improvement which comprises passing said reactive aromatic material in finely-divided form through a heated polymerization zone to obtain the resulting polymer as finely-divided resinous granules.

2. The process of claim 1 wherein the polymerization is carried out in the presence of a Lewis acid catalyst.

3. The process of claim 1 wherein the major proportion of the product resinous granules are solid particles having particle diameters in the range from about 1 to 50 microns.

4. The process of claim 1 wherein the major proportion of the product resinous granules are foamed particles having particle diameters in the range from about 15 to 1,000 microns.

5. The process of claim 2 wherein the reactive aromatic material is a halomethyldiphenyl ether having an average of from 1.0 to about 3.0 halomethyl groups per diphenyl ether moiety.

6. The process of claim 5 wherein the catalyst is ferric chloride.

References Cited by the Examiner
UNITED STATES PATENTS 2,911,380  11/1959  Doedens _____ 260—47
3,047,518  7/1962  Doedens _____ 260—47

WILLIAM H. SHORT, *Primary Examiner.*